3/24/87 OR 4,652,080

United States Patent [19]

Carter et al.

[11] Patent Number: 4,652,080

[45] Date of Patent: Mar. 24, 1987

[54] OPTICAL TRANSMISSION SYSTEMS

[75] Inventors: Andrew C. Carter, Towcester; Robert C. Goodfellow, Brackley, both of United Kingdom

[73] Assignee: Plessey Overseas Limited, Ilford, England

[21] Appl. No.: 720,355

[22] Filed: Apr. 5, 1985

Related U.S. Application Data

[63] Continuation-in-part of Ser. No. 395,021, Jun. 22, 1982.

[51] Int. Cl.[4] ............ G02B 6/34

[52] U.S. Cl. ............ 350/96.19; 350/96.15; 370/3

[58] Field of Search ............ 350/96.15, 96.17, 96.18, 350/96.19; 370/3

[56] References Cited

U.S. PATENT DOCUMENTS 4,111,524 9/1978 Tomlinson, III ............ 350/96.19

*Primary Examiner*—William L. Sikes
*Assistant Examiner*—Akm E. Ullah
*Attorney, Agent, or Firm*—Fleit, Jacobson, Cohn & Price

[57] ABSTRACT

A system for multiplexed transmission of different wavelengths of light comprises an array of at least two light sources whose images are formed on the end of an optical fibre. The images have displaced spectra so that a different part of the spectrum of each light source is imaged on to the end of the optical fibre and each part is transmitted by the optical fibre. The images themselves may be displaced by displacing the light sources. A number of such arrays having light sources with emission spectra centered on different wavelengths may be used to increase the number of multiplexed transmission channels.

5 Claims, 4 Drawing Figures

OPTICAL TRANSMISSION SYSTEMS

This is a continuation-in-part of application Ser. No. 395,021 filed June 22, 1982.

FIELD OF THE INVENTION

This invention relates to optical transmission systems and more particularly to systems for multiplexed transmission of different wavelengths of light sometimes called Wavelength Division Multiplexing.

In this specification the term "light" also includes light invisible to the human eye, ie. infra red and ultraviolet radiation.

BACKGROUND OF THE INVENTION

In an article entitle "Viabilities of Wavelength-Division-Multiplexing Transmission System Over an Optical Fiber Cable" published in IEEE Transactions on Communications, Vol. Com-26 No. 7 (July 1978) at pages 1082 to 1087, Tetsuya Miki and Hideki-Ishio put forward a Wavelength division multiplexing (WDM) system using light emitting diodes (LEDs) having respective wavelengths of 784 nanometers, 825 nanometers and 858 nanometers.

The three LEDs in Miki et al are independently modulated and, because bandwidth overlap between the LEDs causes some interchannel interference, interchannel interference cancellers are used to effect a reduction in noise so caused.

In another paper published in the magazine Applied Optics dated Apr 15, 1979 at pages 1253–1258 a similar system employing laser diodes was discussed by Kohichi Aoyama and Jun-ichiro Minowa. In this case five laser diodes having respective wavelengths of 810 nanometers, 830 nanometers, 850 nanometers, 870 nanometers and 890 nanometers were used.

As will be seen from these two systems laser diodes permit closer channel spacing than LEDs. This is because laser diodes have a spectrum half-width of less than one-tenth of the spectrum half-width of LEDs.

Considering LEDs more carefully now it will be noted that, say, an 850 nanometer LED produces its peak power at 850 nanometers nominally but this peak power point will vary with temperature and tolerancing by around plus or minus thirty nanometers. The bandwidth to the half-power point is about one hundred nanometers so with drift half power of a nominal 850 nanometer LED may extend anywhere in a range from around 730 nM up to 930 nM in a commercial device.

Since in WDM systems interfering signals need suppressing to about one-one thousandth power (that is thirty dB down) normal roll off separation for a successful system would require channel separations of about 350 nanometers, thus using two LEDs as an example of say 850 nM and 1200 nM centre wavelength.

Another problem with LEDs is maintaining the accuracy of their centre wavelengths. Thus even if the bandwidth and drift problems are overcome, manufacturing LEDs with specific bandwidths requires accurate control of the chemical mix from which they are made. Thus whilst it is possible to manufacture or select small quantities of LEDs to accurate centre wavelength requirements, reliable commercial production of LEDs with closely spaced centre wavelengths separated by say a few nanometers would require a different plant for each centre wavelength manufacturing more accurately than we currently know how.

Accordingly providing a WDM system with narrow channel separation for optical transmission is a major problem.

It is one object of the present invention to provide an optical transmission WDM system in which this problem has been overcome.

It is another object of the present invention to provide an optical transmission system which was a high radiance and efficiency, high degrees of optical isolation between wavelengths and which is rugged and compact.

SUMMARY OF THE INVENTION

According to the present invention an optical transmission system for multiplexed transmission of light comprises an array of light emitting diode elements, each diode element in said array having a broad emission spectra centred on the same wavelength and said diode elements being displaced from each other; a surface; an imagae forming means imaging and displacing spectra emitted from each diode element on said surface in an overlapping relationship, said displacement and overlap occuring with respect to the imaged spectrum of each diode element; and an optical fibre having an end located in said surface positioned in the region of overlap of the imaged spectrum of each said diode such that only a portion of each emitted spectrum is imaged and focussed on said end, and each portion being a different part of the spectrum emitted by each of said diode elements.

A plurality of arrays of light emitting diodes, the light emitting diodes in each array having their emission spectra centred on different wavelengths may be used to increase channel capacities.

BRIEF DESCRIPTION OF THE DRAWINGS

Embodiments of the invention will now be described by way of example only with reference to the accompanying drawings in which.

DESCRIPTION OF THE EMBODIMENTS

Figure 1A:
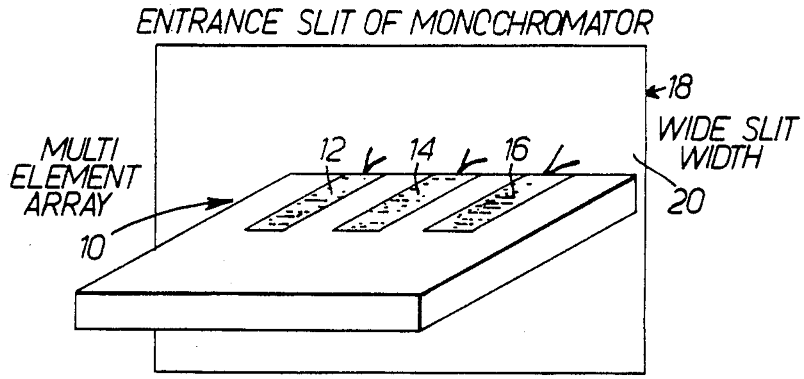
FIGS. 1*a* and 1*b* illustrate schematically the principal of an optical transmission system for multiplexed transmission of light in accordance with the invention.
Figure 1B:
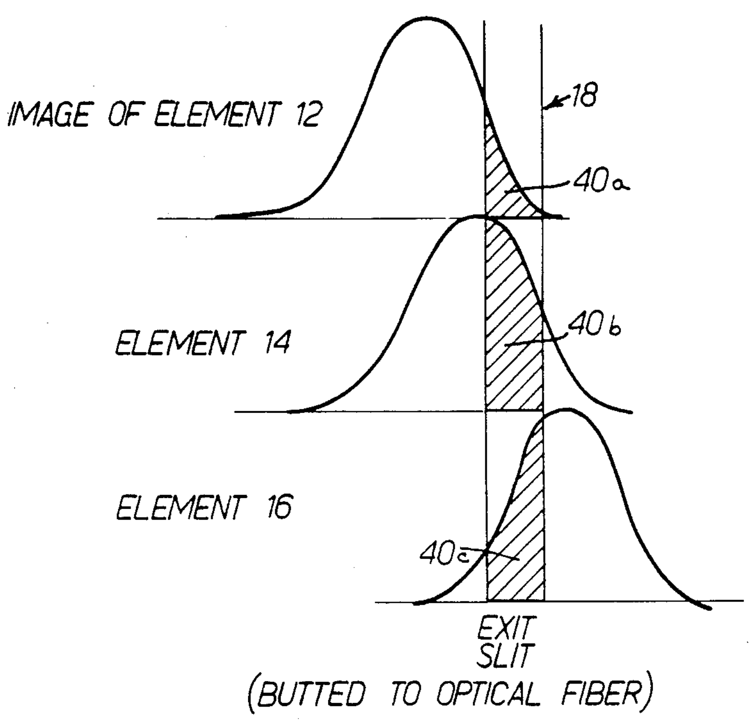
Figure 2:
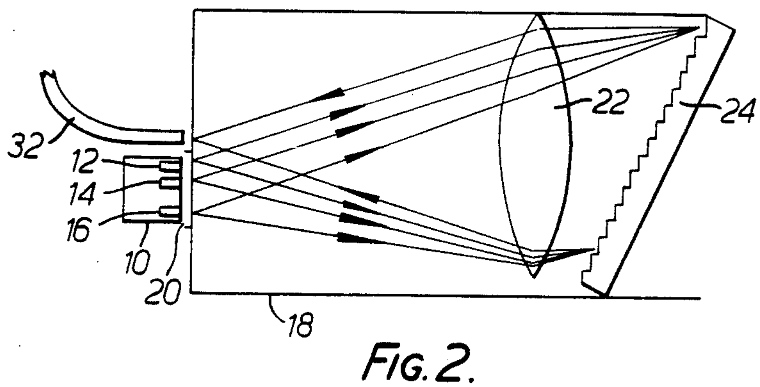
FIG. 2 illustrates a practical arrangement of the transmission system and, FIG. 3 is an alternative arrangement to that of FIG. 2.

FIG. 1*a* illustrates a multi-element array 10 of light emitting diodes (LED's), each element 12, 14 and 16 emitting a broad spectrum in wavelength and each element being centred on the same wavelength. The array 10 is positioned adjacent to a monochromator 18 having a wide entrance slit 20. Th monochromator 18 is illustrated in FIG. 2 and comprises a lens 22 and a dispersive element, in this case a blazed grating 24. The light from each element of the LED array is focussed by the lens 22 on to the grating 24 where it is defracted and reflected back through the lens 22 which focusses an image of the spectrum of each element adjacent to the LED array. Since the elements 12, 14 and 16 are located at different positions adjacent to each other, the three resulting spectrum images are slightly displaced from one another but overlap as illustrated in FIG. 1*b*. Mounted in the side of the monochromator 18 is an optical fibre 32 the end of which is located in the area which receives the three over-lapping spectrum images. Thus the optical fibre 32 receives three different channels 40*a*, 40*b* and 40*c* corresponding to a portion of each of the three spectrum images from elements 12, 14 and 16, respectively, as illustrated in FIG. 1*b* and the fibre then transmits these multiplexed channels. A similar monochromator (not shown) is also used at the other end of the fibre which demultiplexes the signals (the defraction at the grating is proportional to wavelength and three multiplexed channels are therefore separated) in conjunction with a detector array.

The LED 10 emits at high radiance and efficiency and the monochromataor gives a very high degree of isolation (both optical and electrical) between the parts of the spectra transmitted along the fibre 32.

The monochromator 18 images at the high numerical aperature of multimode fibres (~0.2–0.3) with small aberrations and attenuation, has the correct dispersion characteristics and which is fabricated as a compact and rugged component.

The LED multi-element array 10 may be any of several material systems including lead-tin telluride, gallium phosphide, gallium arsenide, gallium arsenide phosphide, gallium-indium-arsenide-phosphide, gallium arsenide, and also double heterostructure gallium aluminium arsenide. The two latter material systems have many attractions for fibre optic applications.

One example of a gallium arsenide array is a zinc diffused surface emitting array comprising eight $25\times100\mu m^2$ elements with $100\mu m$ spacing between elements. In this case the individual elements are separated completely by chemical etching to give a very high degree of electrical and optical isolation but positional accuracy is maintained because of a continuous gold integral heatsink pad. Each element emits at radiances around 20 watts/st/$cm^2$ at current drives of 300 mA which corresponds to 1 mw output per element.

Another example is a 16 element edge emitting array which is fabricated in double heterostructure GaAlAs material. This is a lower current device with a power output of 30μw per element at a current of 30 mA. Each emission element is $20\mu m\times1\mu m$ in size.

The emitting dimensions for each element, and the number of elements for each array can be altered to suit system requirements.

With the correct type of lens 32 in the monochromator 18 diffraction limited optics are straight forwardly achieved and a high quality grating 24 used at the blaze angle will reflect at 90% efficiency. Thus low overall insertion loss is achievable with such a monochromator. This optical arrangement is set up in a 1 cm long metal tube and so is rugged and compact as well as optically efficient.

Figure 3:
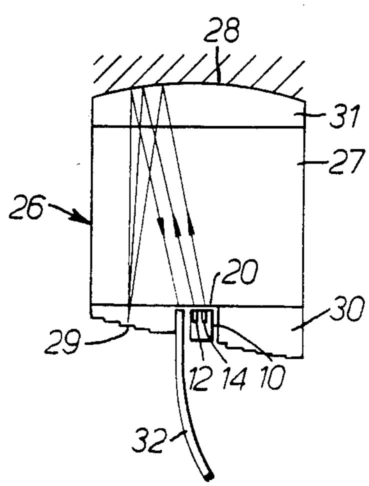

An alternative monolithic structure 26 is illustrated in FIG. 3. In this case a concave reflector 28 is used in place of the lens 22 and a grating 29 is used as the dispersive element.

This optical structure consists of three optical parts:

A body part 27, a reflector part 31 having the curved reflector 28 and a small angle prism 30 with a grating 29. This has the advantage of solid geometry, and as all the light rays are optically immersed any aberrations are smaller than for an equivalent free space configuration. This structure can also be made in a thin plate waveguide form which can be very small and manufactured in large quantities at relatively low cost.

In this case light diverging from each element 12 or 14 of the LED array 10 is collimated into a parallel beam by the reflector 28. It is diffracted at the grating 29 so that a slightly angled parallel beam is reflected towards the reflector 28 and is then re-imaged adjacent to the LED array 10. As before the fibre 32 receives light from the variously displaced elements of the LED array thus launching different sections of the spectrum along the fibre 32 from each element.

The multiplexing scheme of FIG. 1*a* creates multiple channels 40 shown in FIG. 1*b* by cutting the spectral emission of each element 12, 14 or 16 into sections but various sophistications can be introduced to optimise the launch power.

With a surface emitter array, enhancement of coupled power by a factor of 10–20 can be achieved by fitting each element with a spherical microlens. Alternatively a 3–5 times improvement can be achieved by the use of a cylindrical lens (eg. a glass fibre) which extends across all of the elements and this can be applied to both the edge and surface types of arrays.

The near gaussian spectral emission of LED's implies a corresponding variation in launch power for the different wavelength channels 40. This effect can be reduced by 'Element width tailoring' in which the end of the elements 12, 14, 16 of the array 10 are made proportionately wider so that the widths of the different channels 40 is not constant. Alternatively the current drive to the elements can be adjusted to level the launch powers.

Seven elements giving seven channels 40 (a minimum requirement for one specific application) can easily be driven from one LED array and this number can be multiplied by using other similar arrays with emission spectra centred at other wavelengths. A spectrum centred at a different wavelength can provide seven further different channels and LED arrays with wavelengths centred at 0.8μm, 0.85μm, 0.9μm and 1.05μm each with a bandwidth of 0.1μm can be used. The channels can then be 0.80–0.85, 0.85–0.9, 0.9–0.95 and 0.95–1.0 and used with silicon arrays as detectors.

A further five LED arrays can also be used (GaInAsP/InP types ) if long wavelength detector arrays are utilised. Thus potentially a 7×9–63 channel wavelength multiplex system can be operated over a single fibre.

We claim:

1. An optical transmission system for the multiplexed transmission of light comprising: an array of light emitting diode elements, each diode element in said array having a broad emission spectra centred on the same wavelength and said diode elements being displaced from each other; a surface; an image forming means imaging and displacing spectra emitted from each diode element on said surface in an overlapping relationship, said displacement and overlap occurring with respect to the imaged spectrum of each diode element; and an optical fibre having an end located in said surface positioned in the region of overlap of the imaged spectrum of each said diode such that only a portion of each emitted spectrum is imaged and focussed on said end, and each portion being a different part of the spectrum emitted by each of said diode elements.

2. An optical transmission system as claimed in claim 1 wherein the launch power for each portion of said spectrum image received by said optical fibre is substantially equalized.

3. An optical transmission system as claimed in claim 2 wherein said launch power for each power of said spectrum image is substantially equalized by varying the sizes of said diode elements.

4. An optical transmission system as claimed in claim 2 wherein said launch power for each portion of said spectrum image is substantially equalized by adjusting the current drive to each said diode element.

5. An optical transmission system is claimed in claim 1 having a plurality of arrays of light emitting diode elements, the element in each said array having emission spectra centred on the same wavelength which differs from the wavelength on which the emission spectra of the elements of the other arrays are centred.

* * * * *